United States Patent
Iwase

(10) Patent No.: US 9,394,416 B2
(45) Date of Patent: Jul. 19, 2016

(54) FUNCTIONAL FILM AND METHOD OF MANUFACTURING FUNCTIONAL FILM

(75) Inventor: Eijirou Iwase, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 811 days.

(21) Appl. No.: 13/222,497

(22) Filed: Aug. 31, 2011

(65) Prior Publication Data
US 2012/0052272 A1    Mar. 1, 2012

(30) Foreign Application Priority Data
Aug. 31, 2010 (JP) ................. 2010-194272

(51) Int. Cl.
| B32B 7/02 | (2006.01) |
| C23C 14/00 | (2006.01) |
| B05D 1/36 | (2006.01) |
| C08J 7/04 | (2006.01) |
| G02B 1/14 | (2015.01) |

(52) U.S. Cl.
CPC . C08J 7/045 (2013.01); G02B 1/14 (2015.01); Y10T 428/2495 (2015.01)

(58) Field of Classification Search
CPC ..... C08J 7/045; C08J 7/042; C08J 7/12–7/18; B32B 7/02
USPC ......... 428/212–220, 480, 483, 688–689, 699, 428/701–702, 704, 446, 448, 450–451; 351/159.6, 159.62–159.65, 159.01, 44, 351/159.57; 359/577, 580–582, 584–590
See application file for complete search history.

(56) References Cited

U.S. PATENT DOCUMENTS

| 5,103,337 | A | * | 4/1992 | Schrenk et al. ............... 359/359 |
| 5,925,438 | A | | 7/1999 | Ota et al. |
| 8,137,801 | B2 | | 3/2012 | Walker, Jr. et al. |
| 8,240,859 | B2 | | 8/2012 | Asakura et al. |
| 8,470,439 | B2 | | 6/2013 | Walker, Jr. et al. |
| 2002/0018886 | A1 | | 2/2002 | Matsufuji et al. |
| 2004/0018364 | A1 | | 1/2004 | Ota et al. |
| 2007/0286994 | A1 | | 12/2007 | Walker et al. |
| 2010/0079868 | A1 | | 4/2010 | Asakura et al. |

FOREIGN PATENT DOCUMENTS

| CN | 101685168 | 3/2010 |
| CN | 101809465 | 8/2010 |

(Continued)

OTHER PUBLICATIONS

Machine translation of JP2006-123307. Retrieved Jun. 26, 2014.*
Dobrowolski, J.A. (eds. Bass et al.). "Optical Properties of Films and Coatings". Handbook of Optics: vol. I, Fundamentals, Techniques, and Designs, (1995); pp. 42.3-42.130.*

(Continued)

Primary Examiner — Prashant J Khatri
(74) Attorney, Agent, or Firm — Young & Thompson

(57) ABSTRACT

A functional film includes a substrate, at least two organic layers including a first organic layer directly formed on the substrate and a second organic layer being an uppermost layer farthest from the substrate, and at least one inorganic layer. The reminder of the least two organic layers except the second organic layer and the at least one inorganic layer are laminated on the substrate in such a way that one of the at least one inorganic layer is formed on each of the reminder of the least two organic layers. The first organic layer is thickest in the at least two organic layers, and the second organic layer is thinnest in the at least two organic layers and thicker than a thickest inorganic layer in the at least one inorganic layer.

10 Claims, 2 Drawing Sheets

(56) References Cited

FOREIGN PATENT DOCUMENTS

| | | |
|---|---|---|
| JP | 10-728 | 1/1998 |
| JP | 10-278167 | 10/1998 |
| JP | 2001-337202 | 12/2001 |
| JP | 2003-288029 | 10/2003 |
| JP | 2005114876 | 4/2005 |
| JP | 2006-123307 | 5/2006 |
| JP | 2009-269193 | 11/2009 |
| JP | 2001-310423 | 11/2011 |

OTHER PUBLICATIONS

"Aronix(R) M-Series Technical Datasheet". Toagosei Co, Ltd., (2009); pp. 1-2.*
European Search Report—EP 11 17 9521—Feb. 2, 2012.
Japanese Official Action—2010-194272—Apr. 1, 2014.
European Patent Application No. 11179521.7; dated Nov. 8, 2013.
Japanese Official Action—2010-194272—Sep. 10, 2013.
CN Office Action dated Jun. 20, 2014, with English Translation; Application No. 201110254755.0.
Chinese Office Action, dated Jan. 28, 2015, in corresponding Chinese Patent Application No. 201110254755.0.

* cited by examiner

FUNCTIONAL FILM AND METHOD OF MANUFACTURING FUNCTIONAL FILM

BACKGROUND OF THE INVENTION

This invention relates to a functional film obtained by laminating a plurality of layers and a method of manufacturing a functional film.

Gas barrier films obtained by forming a film with a gas barrier property on a base film such as a polyethylene terephthalate (PET) film are used as packaging materials for packaging portions or constituent parts, which require a moisture-proof property, in various kinds of devices such as optical devices, display devices including liquid crystal display devices or organic EL display devices, semiconductor devices, and thin-film solar cells, food, clothing, electronic components, and the like.

Films formed of various kinds of inorganic materials (inorganic compound), such as silicon nitride, silicon oxide, and aluminium oxide, are known as films with a gas barrier property formed in such a gas barrier film.

In addition, a laminated gas barrier film (gas barrier laminate) formed by laminating a plurality of layers, such as an organic layer (organic compound layer) and an inorganic layer (inorganic compound layer), in order to obtain the better gas barrier property is also known.

For example, JP 2009-269193 A discloses a method of manufacturing a laminate in which a coated layer is formed by applying application liquid containing a monomer or an oligomer on a base, a process of forming an organic layer by curing the coated layer is repeated, a lower layer including two or more organic layers is formed, and an inorganic layer is formed on the lower layer using a vacuum deposition method.

In the method disclosed in JP 2009-269193 A, the lower layer including two or more organic layers is formed on the surface of the substrate. Accordingly, since irregularities caused by foreign matter adhering to the substrate surface can be covered, the surface of the lower layer can be made smooth. As a result, since the occurrence of a defect in the inorganic layer formed on the lower layer is suppressed, it is possible to realize a gas barrier film with an excellent gas barrier property.

Moreover, in the gas barrier film in which an organic layer and an inorganic layer are laminated, the inorganic layer showing the gas barrier property is protected mainly by forming the organic layer on the inorganic layer. In addition, a plurality of organic layers and a plurality of inorganic layers may be laminated in order to obtain the better gas barrier property. That is, another organic layer may be further formed on the inorganic layer formed on the organic layer and another inorganic layer may be formed on the organic layer in order to obtain the better gas barrier property.

Here, functional films used in optical devices, display devices including liquid crystal display devices or organic EL display devices, and the like are required to have not only a gas barrier property but also an excellent light transmittance.

In the gas barrier film in which an organic layer and an inorganic layer are laminated, however, organic layers other than the organic layer formed on the base are formed with an inorganic layer as a base. Since there is a difference between the refractive index of an inorganic layer formed to obtain a gas barrier property and the refractive index of an organic layer, the reflectance at the interface between the inorganic layer and the organic layer increases and the light transmittance decreases accordingly.

In order to improve the gas barrier property, it is preferable to improve the smoothness by making an organic layer as a base of an inorganic film thick. However, if the organic layer is formed too thick, cracking or the like occur.

SUMMARY OF THE INVENTION

It is an object of the present invention to solve the problems in the related art and to provide a functional film with an organic layer and an inorganic layer alternately laminated, which shows an excellent gas barrier property and which can obtain the high light transmittance and can prevent cracking of a film and the like, and a method of manufacturing a functional film.

In order to solve the above-described problems, according to a first aspect of the present invention, there is provided a functional film comprising: a substrate; at least two organic layers; and at least one inorganic layer, wherein the at least two organic layers include a first organic layer directly formed on the substrate and a second organic layer which is an uppermost layer farthest from the substrate, wherein each of the at least two organic layers and each of the at least one inorganic layers are alternatively laminated on the substrate in such a way that one of an inorganic layer and an inorganic layer is formed on the other of the inorganic layer and the inorganic layer, wherein the first organic layer is thickest in the at least two organic layers, and the second organic layer is thinnest in the at least two organic layers, and wherein the second organic layer is thicker than a thickest inorganic layer in the at least one inorganic layer.

In this case, it is preferable that a highest refractive index in each refractive index of the at least two organic layers be lower than a lowest refractive index in each refractive index of the at least one inorganic layer.

In addition, it is preferable that a thickness of the first organic layer range from 500 nm to 3000 nm, and a thickness of the second organic layer range from 80 nm to 1000 nm.

In addition, it is preferable that the at least one inorganic layer be formed of silicon nitride, silicon oxide, silicon oxynitride, or aluminium oxide.

In addition, it is preferable that a refractive index of the second organic layer be lowest in respective refractive indices of the at least two organic layers.

In addition, it is preferable that the first organic layer and the second organic layer be made of different materials, respectively.

In addition, according to second aspect of the present invention, a method of manufacturing a functional film in which at least two organic layers and at least one inorganic layer are laminated on a substrate in such a way that one of an inorganic layer and an inorganic layer is formed on the other of the inorganic layer and the inorganic layer, comprising the steps of: forming a first organic layer in the at least two organic layers directly on the substrate so as to be thickest in the at least two organic layers; forming an inorganic layer in the at least one inorganic layer on the first organic layer; and forming another organic layer in the at least two organic layers on the inorganic layer, wherein the forming step of the inorganic layer and the forming step of the another organic layer are performed at least once, and in the final forming step of the another organic layer, the uppermost organic layer as a second organic layer is formed on an inorganic layer which is located farthest from the substrate in the at least one inorganic layer so as to be thinnest in the at least two organic layers and to be thicker than a thickest inorganic layer in the at least one inorganic layer.

In this case, it is preferable that a highest refractive index in each refractive index of the at least two organic layers be set to be lower than a lowest refractive index in each refractive index of the at least one inorganic layer.

In addition, it is preferable that the at least two organic layers be formed using an application method.

In addition, it is preferable that the second organic layer be formed by the application method using a die coater.

In addition, it is preferable that, when applying a forming material for forming the first organic layer, the viscosity of the forming material of the first organic layer be equal to or smaller than 10 cP.

In addition, it is preferable that, when applying a forming material for forming the second organic layer, the viscosity of the forming material of the second organic layer be equal to or smaller than 5 cP.

In addition, it is preferable that the at least one inorganic layer be formed using a vacuum deposition method.

In addition, it is preferable that the second organic layer be formed so as to have a lowest refractive index in the at least two organic layers.

According to the aspect of the present invention, at least two organic layers and at least one inorganic layer are alternately formed on the substrate, an uppermost layer farthest from the substrate is formed as an organic layer, the thickness of the first organic layer directly formed on the substrate is equal to or larger than those of other organic layers, the thickness of the uppermost organic layer is equal to or smaller than those of other organic layers, and all organic layers are formed so as to be thicker than all inorganic layers. Therefore, an excellent gas barrier property can be obtained since the inorganic layer is formed on the organic layer with a smooth surface, and the high light transmittance can be obtained since the uppermost organic layer is formed so as to be thinner than other organic layers. In addition, since the thicknesses of organic layers other than the first organic layer are set to be equal to or smaller than that of the first organic layer, cracking of the organic layer can be prevented.

BRIEF DESCRIPTION OF THE DRAWINGS

FIG. 2A is an organic film forming apparatus and FIG. 2B is an inorganic film forming apparatus.

DETAILED DESCRIPTION OF THE INVENTION

Hereinafter, a functional film and a method of manufacturing a functional film according to preferred embodiments of the present invention will be described with reference to the accompanying drawings.

Figure 1:
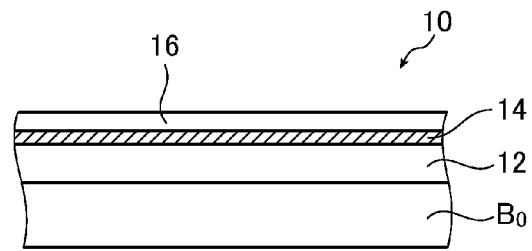
FIG. 1 is a conceptual view showing an example of a functional film according to an embodiment of the present invention.

FIG. 1 is a conceptual view showing an example of a functional film according to an embodiment of the present invention.

As shown in FIG. 1, the functional film according to the embodiment of the present invention is a functional film 10 obtained by forming a first organic layer 12 having a polymer as its main component on the surface of a substrate $B_0$, forming an inorganic layer 14 on the first organic layer 12 using a vacuum deposition method, and forming an uppermost organic layer 16 with a smaller thickness than the first organic layer 12 on the inorganic layer 14.

Basically, the first organic layer 12 serves to make the inorganic layer 14 as a gas barrier smooth so that the inorganic layer 14 can show the sufficient gas barrier property.

In addition, the uppermost organic layer 16 is basically a protective layer for protecting the inorganic layer 14.

Figure 2A:
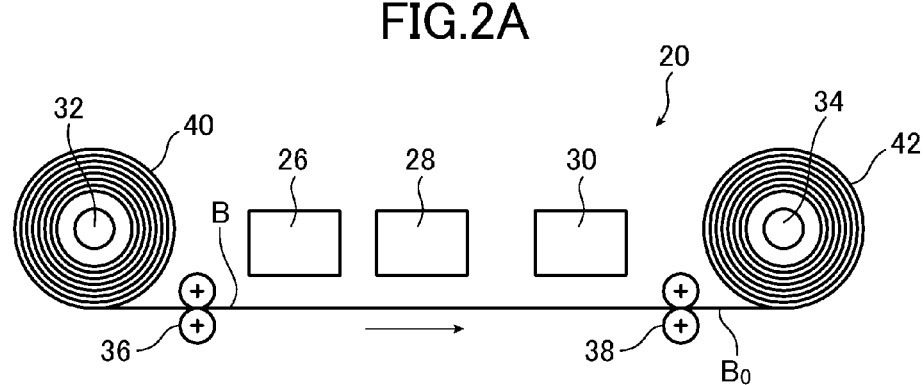
FIGS. 2A and 2B are conceptual views showing an example of a manufacturing apparatus for executing a method of manufacturing a functional film according to an embodiment of the present invention, where
Figure 2B:
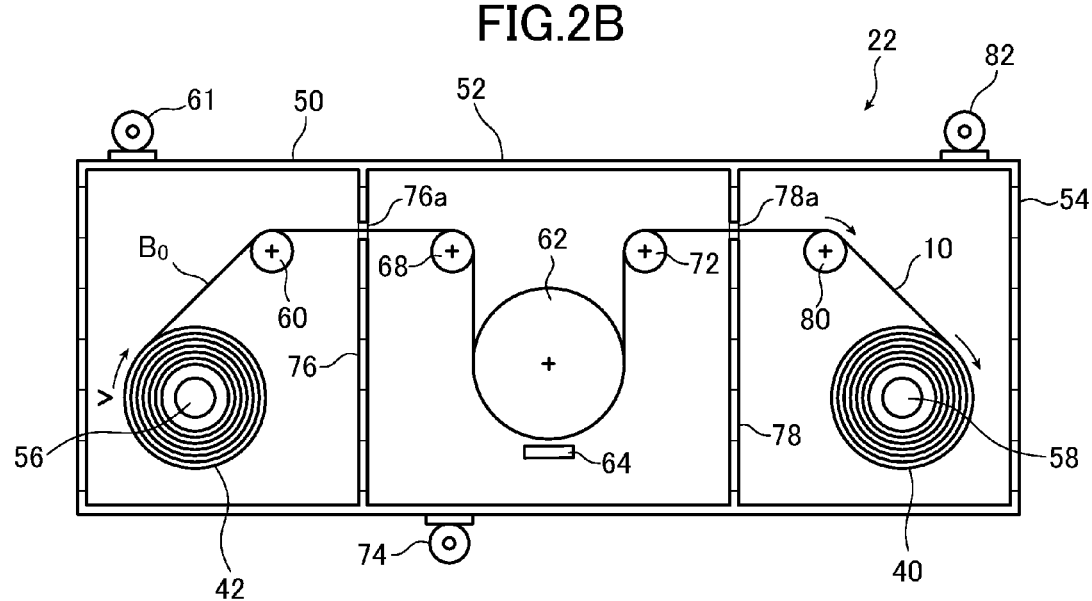

FIGS. 2A and 2B are conceptual views showing an example of a manufacturing apparatus for executing a method of manufacturing a functional film according to an embodiment of the present invention.

The method of manufacturing a functional film according to the embodiment of the present invention is executed by an organic film forming apparatus 20 shown in FIG. 2A and an inorganic film forming apparatus 22 shown in FIG. 2B.

The organic film forming apparatus 20 forms the first organic layer 12 on the surface of the substrate $B_0$ while transporting the long substrate film $B_0$ (original film; hereinafter, referred to as a substrate $B_0$) in its longitudinal direction.

On the other hand, the inorganic film forming apparatus 22 forms the inorganic layer 14 on the first organic layer 12 while transporting the substrate $B_0$, on which the first organic layer 12 is formed, in its longitudinal direction.

In addition, the organic film forming apparatus 20 forms the uppermost organic layer 16 on the inorganic layer 14 while transporting the substrate $B_0$ on which the first organic layer 12 and the inorganic layer 14 are formed, in its longitudinal direction.

As a result, the functional film 10 according to the embodiment of the present invention shown in FIG. 1 is manufactured by the apparatuses shown in FIGS. 2A and 2B.

As an example, the organic film forming apparatus 20 is an apparatus which forms the first organic layer 12 on the surface of the substrate $B_0$ by applying/drying a coating material containing a monomer (monomer mixture), which becomes the first organic layer 12, on the substrate $B_0$ and polymerizing the monomer.

In addition, the organic film forming apparatus 20 forms the uppermost organic layer 16 on the surface of a substrate $B_{m2}$ in which the first organic layer 12 and the inorganic layer 14 are formed (hereinafter, simply referred to as a "substrate $B_{m2}$") by applying/drying a coating material containing a monomer (monomer mixture), which becomes the uppermost organic layer 16, on the substrate $B_{m2}$ and polymerizing the monomer. Thus, the organic film forming apparatus 20 is also an apparatus which completes the functional film according to the embodiment of the present invention.

In the example shown in the drawing, the organic film forming apparatus 20 includes application means 26, drying means 28, a UV irradiation device 30, a rotary shaft 32, a winding shaft 34, and a pair of transport rollers 36 and 38.

Moreover, in the following explanation, the substrates $B_0$ and $B_{m2}$ are simply called a "substrate B" when it is not necessary to distinguish the substrate $B_0$ from the substrate $B_{m2}$. Similarly, the first organic layer 12 and the uppermost organic layer 16 are simply called an "organic layer" when it is not necessary to distinguish the first organic layer 12 from the uppermost organic layer 16.

The organic film forming apparatus 20 is an apparatus which feeds the substrate B from a substrate roll 40 in which the long substrate B (original film) is wound in a roll form, forms an organic layer (the first organic layer 12 or the uppermost organic layer 16) while transporting the substrate B in its longitudinal direction, and winds the substrate B on which the organic layer is formed in a roll form. That is, the organic film forming apparatus 20 is an apparatus which forms a film by the so-called roll-to-roll process.

In the organic film forming apparatus 20, the long substrate B is mounted on the rotary shaft 32 as the substrate roll 40 as described above.

Once the substrate roll 40 is mounted on the rotary shaft 32, the substrate B is transported along a predetermined transport path. That is, the substrate B moves from the substrate roll 40 through the transport roller pair 36, passes below the application means 26, the drying means 28, and the UV irradiation device 30, and passes through the transport roller pair 38 to reach the winding shaft 34. In the organic film forming apparatus 20, feeding of the substrate B from the substrate roll 40 and winding of the substrate B on the winding shaft 34 are performed simultaneously, and an organic layer (the first organic layer 12 or the uppermost organic layer 16) is continuously formed on the substrate B while transporting the long substrate B in its longitudinal direction along the predetermined transport path.

In the present invention, the substrate $B_0$ (substrate of a functional film) on which the first organic layer 12 is formed is not particularly limited. All various kinds of substrates (base films) used for various kinds of functional films, such as a gas barrier film, an optical film, and a protection film, are available as long as the first organic layer 12, the uppermost organic layer 16, and the inorganic layer 14 based on the vacuum deposition to be described later can be formed. Examples of the substrate include various kinds of resin films such as a PET film and various kinds of metal sheets such as an aluminum sheet.

In addition, various kinds of films, such as a protective film and a bonding film, may be formed on the surface of the substrate $B_0$.

Specifically, various kinds of known substrates used for a functional film are available as the substrate $B_0$ (web-like base (substrate, support body)).

Specifically, plastic films formed of plastic materials (polymer materials), such as polyethylene terephthalate (PET), polyethylenenaphthalate (PEN), polyethylene, polypropylene, polystyrene, polyamide, polyvinyl chloride, polycarbonate, polyacrylonitrile, polyimide, polyacrylate, and polymethacrylate, may be mentioned as preferred examples of the substrate $B_0$.

In addition, the substrate $B_0$ may also be formed by forming layers (films) for obtaining various kinds of functions, such as a protective layer, a bonding layer, a light reflection layer, an anti-reflection layer, a shielding layer, a planarizing layer, a buffer layer, and a stress reducing layer, on the surface (surface on which the first organic layer 12 is to be formed) of the above plastic film.

As described above, the organic film forming apparatus 20 forms an organic film (organic layer; the first organic layer 12 and the uppermost organic layer 16), which contains a polymer or an oligomer as its main component, on the surface of the substrate $B_0$.

Specifically, preferred examples of an organic film include films formed of thermoplastic resins, such as polyester, acrylic resin, methacrylic resin, methacrylic acid-maleic acid copolymer, polystyrene, transparent fluororesin, polyimide, fluorinated polyimide, polyamide, polyamide-imide, polyether imide, cellulose acylate, polyurethane, polyetheretherketone, polycarbonate, alicyclic polyolefine, polyarylate, polyether sulfone, polysulfone, polycarbonate modified with fluorene ring, polycarbonate modified with alicycle, polyester modified with fluorene ring, and acryloyl compound, polysiloxane, and other organosilicon compounds.

Among these, from the point of view of smoothness and heat resistance which are effective for the gas barrier property, an organic layer formed of polymers of radically polymerizable compound and/or cationically polymerizable compound having an ether group as a functional group is preferable. Especially, acrylic resin or methacrylic resin having polymers of acrylate and/or methacrylate monomers as its main component is preferably used.

As described above, the organic film forming apparatus 20 is for forming an organic film by an application method (solution application method), and includes the application means 26, the drying means 28, and the UV irradiation device 30.

Such an organic film forming apparatus 20 forms an organic film by applying the coating material containing a monomer mixture prepared in advance on the substrate B using the application means 26 and drying and polymerizing it.

The substrate B fed from the substrate roll 40 is transported in a state interposed between the transport roller pair 36. First, the substrate B is transported to the application means 26. The application means 26 applies a coating material containing monomer, which is prepared in advance and serves as an organic film, on the surface of the substrate B.

The method of applying a coating material is not particularly limited, and all kinds of known methods, such as a dip coating method, an air knife coating method, a curtain coating method, a roller coating method, a wire bar coating method, a gravure coating method, and a slide coating method, may be used.

When forming an organic layer other than the first organic layer 12, that is, forming an organic layer formed on an inorganic layer, an application method using a die coater is appropriately used in a point that materials other than the coating material are not in contact with the inorganic layer.

In addition, the organic film forming apparatus 20 in the example shown in the drawing forms an organic film by polymerizing the monomer by irradiation with UV light, which will be described later. For this reason, it is preferable that the coating material applied by the application means 26 contain a photopolymerization initiator (it is preferable to use a photopolymerization initiator together).

Then, the substrate B is transported to the drying means 28. The drying means 28 dries the coating material applied by the application means 26.

The method of drying a coating material is not particularly limited, and it is possible to use all kinds of known drying methods, such as heat drying using a heater or heat drying using warm air, as long as a coating material can be dried before reaching the UV irradiation device 30 according to the transport speed of the substrate B and the like.

Then, the substrate B is transported to the UV irradiation device 30. The UV irradiation device 30 emits ultraviolet rays (UV light) to the coating material, which is applied by the application means 26 and dried by the drying means 28, to polymerize the monomer, thereby forming an organic film.

The method of polymerizing monomers is not limited to the UV irradiation in the example shown in the drawing, and heating polymerization, light (visible light) polymerization, electron beam polymerization, plasma polymerization, or combination thereof (including UV irradiation) may also be appropriately used.

In addition, in the method of manufacturing a functional film according to the embodiment of the present invention, the method of forming an organic film is not limited to the application method in the example shown in the drawing, and a vacuum deposition method may also be appropriately used.

Although the vacuum deposition method is not particularly limited, film forming methods using vapor deposition, plasma CVD, and the like are preferable. Among them, a flash evaporation method disclosed in U.S. Pat. No. 4,842,893 B, U.S. Pat. No. 4,954,371 B, and U.S. Pat. No. 5,032,461 B is especially preferable. The flash evaporation method is especially useful since it has an effect of reducing dissolved oxygen in a monomer and accordingly, it is possible to increase a polymerization rate.

In the present invention, a polymer may be applied as a solution, or it is possible to use a hybrid coating method using an inorganic material which is disclosed in JP 2000-323273 A and JP 2004-25732 A. In addition, a polymer layer may be formed by forming a precursor (for example, a monomer) of a polymer as a film and polymerizing it. In addition, the first organic layer 12 may also be formed by applying and curing a polymerizable adhesive which is commercially available.

Moreover, in the present invention, a method using application is preferable as a method of forming an organic film since irregularities or deposits of the surface of the substrate $B$ are covered so that the smoothness of the surface of an organic film, which serves as a base when forming an inorganic film, can be improved. By improving the smoothness of the surface of the organic film, the occurrence of a defect in the inorganic film formed on the organic film can be prevented. As a result, the gas barrier property of a functional film can be improved.

In the present invention, the first organic layer 12 is formed with a largest thickness among all organic layers, and the uppermost organic layer 16 is formed with a smallest thickness among all organic layers. That is, in the functional film 10 according to the present embodiment shown in FIG. 1, the first organic layer 12 is formed so as to be thicker than the uppermost organic layer 16.

The surface of the substrate $B_0$ of the functional film has irregularities of the substrate itself or irregularities caused by foreign matter adhering thereto, these irregularities are the cause of a defect of an inorganic film. As a result, the gas barrier property may become worse. In the present invention, however, the surface smoothness can be improved by forming the first organic layer 12 formed on the substrate $B_0$ so as to have a largest thickness among all organic layers and also forming the first organic layer 12, which has a sufficient thickness so that the irregularities of the substrate $B_0$ can be covered, on the substrate $B_0$. As a result, since the occurrence of a defect in the inorganic layer 14 formed on the first organic layer 12 can be suppressed, an excellent gas barrier property can be realized.

On the other hand, the inorganic layer 14 serves as a base of the uppermost organic layer 16. In a functional film, an inorganic layer has a higher refractive index than an organic layer. Accordingly, if an organic layer is formed on an inorganic layer, the reflectance is increased between the inorganic layer and the organic layer. As a result, the transmittance is reduced. Therefore, in the present invention, a reduction in the transmittance is prevented by forming the uppermost organic layer 16 with a smallest thickness among all organic layers.

In addition, the uppermost organic layer 16 serves as a protective layer for protecting the inorganic layer 14. Accordingly, since the uppermost organic layer 16 does not serve as a base of an inorganic layer, the uppermost organic layer 16 does not need to be formed thick in order to improve the surface smoothness.

If the organic layer is formed too thick, the organic layer may crack. Accordingly, the uppermost organic layer 16 which does not need to be formed thick is formed thin in order to prevent cracking.

In addition, in the present invention, all organic layers are formed so as to be thicker than all inorganic layers. That is, in the present embodiment, the first organic layer 12 and the uppermost organic layer 16 are formed so as to be thicker than the inorganic layer 14. As described above, since an inorganic layer is formed on an organic layer which covers irregularities and has a smooth surface, it is not necessary to form the inorganic layer thick in order to prevent the occurrence of a defect. Therefore, even if the inorganic layer is formed thin, a sufficient gas barrier property can be realized since a defect does not occur.

In addition, since all organic layers are formed so as to be thicker than all inorganic layers, they can be satisfactorily protected. This is preferable in a point that impact resistance and the like can be improved. In addition, since the productivity of an organic layer is higher than that of an inorganic layer, there is no problem in productivity even if a thick organic layer is added.

Here, it is preferable to set the thickness of the first organic layer 12 to 500 to 3000 nm. By forming the first organic layer 12 with a thickness of 500 nm or more, irregularities on the substrate $B_0$ can be sufficiently covered. As a result, it is possible to improve the smoothness of the surface as a base for forming an inorganic layer. In addition, if the first organic layer 12 is formed too thick, the first organic layer 12 may crack or the transmittance may be reduced. Therefore, it is preferable to form the first organic layer 12 with a thickness of 3000 nm or less. In addition, it is more preferable to set the thickness of the first organic layer 12 to 500 to 2500 nm.

In addition, it is preferable to set the thickness of the uppermost organic layer 16 to 80 to 1000 nm. By setting the thickness of the uppermost organic layer 16 to 80 nm or more, the inorganic layer 14 can be sufficiently protected. In addition, it is preferable to form the uppermost organic layer 16 with a thickness of 1000 nm or less in a point that cracking can be prevented and a reduction in the transmittance can be prevented. In addition, it is more preferable to set the thickness of the uppermost organic layer 16 to 80 to 500 nm.

In addition, it is preferable that the refractive index of the uppermost organic layer 16 be lower than those of other organic layers. That is, in the present embodiment, it is preferable that the refractive index of the uppermost organic layer 16 be lower than that of the first organic layer 12.

The uppermost organic layer 16 is an interface with the air in the functional film 10. If a refractive index difference between the uppermost organic layer 16 and the air is large, the reflectance at the interface is increased and the transmittance is reduced. Therefore, by forming the uppermost organic layer 16 with a lower refractive index than other organic layers, it is possible to prevent an increase in the reflectance at the interface between the uppermost organic layer 16 and the air and eventually to prevent a reduction in the transmittance.

Specifically, it is preferable to set the refractive index of the uppermost organic layer 16 to 1.35 to 1.55. By setting the refractive index of the uppermost organic layer 16 in this range, it is possible to prevent an increase in the reflectance at the interface with the air and eventually to prevent a reduction in the transmittance.

In addition, it is preferable that the refractive indices of organic layers other than the uppermost organic layer 16 be 1.45 to 1.72. That is, in the present embodiment, it is preferable that the refractive index of the first organic layer 12 be 1.45 to 1.72. By setting the refractive indices of organic layers other than the uppermost organic layer 16 in this range, it is possible to prevent an increase in the reflectance at the interface with the inorganic layer and eventually to prevent a reduction in the transmittance.

In addition, the uppermost organic layer 16 and other organic layers may be formed of different materials so as to have different refractive indices. Alternatively, hollow silica particles and the like may be added to a material of the uppermost organic layer 16 so that the refractive index of the formed organic layer 16 becomes low. Alternatively, zirconium oxide, titanium oxide, and the like may be added to other organic layers (first organic layer 12) so that the refractive indices of the other organic layers become high.

In addition, it is preferable that the viscosity of a coating material when applying the coating material of the first organic layer 12 be set to 10 cP or less. By setting the viscosity of a coating material of the first organic layer 12 to 10 cP or less, it is easy to cover the irregularities of the surface of the substrate $B_0$ and to improve the smoothness of the surface formed. In addition, when forming the first organic layer 12 by application using a die coater, it is preferable that the viscosity of a coating material of the first organic layer 12 be 0.8 cP or more. When the viscosity of a coating material is 0.8 cP or less, a liquid drop phenomenon occurs. This is not preferable.

In addition, it is preferable that the viscosity of a coating material when applying the coating material of the uppermost organic layer 16 be set to 5 cP or less. By setting the viscosity of a coating material of the uppermost organic layer 16 to 5 cP or less, it becomes easy to form the uppermost organic layer 16 thin. In addition, when forming the uppermost organic layer 16 by application using a die coater, it is preferable that the viscosity of a coating material of the uppermost organic layer 16 be 0.8 cP or more. When the viscosity of a coating material is 0.8 cP or less, a liquid drop phenomenon occurs. This is not preferable.

The substrate B on which an organic film is formed as described above is transported to the transport roller pair 38 and is interposed therebetween. Then, the substrate B reaches the winding shaft 34 and is rewound in a roll form by the winding shaft 34.

Here, when the first organic layer 12 is formed on the substrate $B_0$, a substrate $B_{y1}$ in which the first organic layer 12 is formed on the substrate $B_0$ (hereinafter, simply referred to as a "substrate $B_{y1}$") is wound in a roll form to become a substrate roll 42, and then the substrate roll 42 is supplied to the inorganic film forming apparatus 22 (feed chamber 50).

On the other hand, when the uppermost organic layer 16 is formed on the substrate $B_{m2}$, the substrate $B_{m2}$ is wound in a roll form by the winding shaft 34 to become a functional film roll. Then, the functional film roll is supplied for the next process.

The inorganic film forming apparatus 22 forms the inorganic layer 14 on the surface of the substrate $B_{y1}$ (that is, the surface of the first organic layer 12) using a vacuum deposition method, and includes the feed chamber 50, a film forming chamber 52, and a take-up chamber 54.

Similar to the organic film forming apparatus 20, the inorganic film forming apparatus 22 is also an apparatus which forms a film by the roll-to-roll process. The inorganic film forming apparatus 22 feeds the substrate $B_{y1}$ from the substrate roll 42, forms the inorganic layer 14 while transporting it in its longitudinal direction, and winding the substrate $B_{m2}$, in which the first organic layer 12 and the inorganic layer 14 are formed, in a roll form using a winding shaft 58.

The feed chamber 50 includes a rotary shaft 56, a guide roller 60, and vacuum exhaust means 61.

In the inorganic film forming apparatus 22, the substrate roll 42 in which the substrate $B_{y1}$ obtained by forming the first organic layer 12 on the substrate $B_0$ is wound is mounted on the rotary shaft 56 of the feed chamber 50.

Once the substrate roll 42 is mounted on the rotary shaft 56, the substrate $B_{y1}$ is transported along a predetermined transport path. That is, the substrate $B_{y1}$ moves from the feed chamber 50 through the film forming chamber 52 and reaches the winding shaft 58 of the take-up chamber 54. Also in the inorganic film forming apparatus 22, feeding of the substrate $B_{y1}$ from the substrate roll 42 and winding of the substrate $B_{m2}$ on the winding shaft 58 are performed simultaneously, and the organic layer 14 is continuously formed on the substrate $B_{y1}$ in the film forming chamber 52 while transporting the long substrate $B_{y1}$ in its longitudinal direction along the predetermined transport path.

In the feed chamber 50, the rotary shaft 56 is made to rotate clockwise in the drawing by a driving source (not shown) so that the substrate $B_{y1}$ is fed from the substrate roll 42. Then, the substrate $B_{y1}$ is guided along the predetermined path by the guide roller 60, so that the substrate $B_{y1}$ is fed to the film forming chamber 52.

In addition, the vacuum exhaust means 61 is disposed at the feed chamber 50, and decompresses the inside of the feed chamber 50 to a predetermined degree of vacuum (pressure) according to the film forming pressure in the film forming chamber 52. In this way, pressure of the feed chamber 50 is prevented from having an adverse effect on the pressure (film formation) of the film forming chamber 52. In addition, it is preferable to use known devices as the vacuum exhaust means 61 similar to vacuum exhaust means 74 of the film forming chamber 52 which will be described later.

In addition to the members shown in the drawing, various kinds of members (transport means) for transporting the substrate $B_{y1}$ along the predetermined path, such as a transport roller pair and a guide member for regulating the position of the substrate $B_{y1}$ in the width direction, may be provided in the feed chamber 50.

The substrate $B_{y1}$ is transported into the film forming chamber 52 by guiding of the guide roller 60.

The film forming chamber 52 is for forming the inorganic layer 14 on the surface of the substrate $B_{y1}$ (that is, the surface of the first organic layer 12) using a vacuum deposition method. In the example shown in the drawing, the film forming chamber 52 includes a drum 62, film forming means 64, a guide roller 68, a guide roller 72, and the vacuum exhaust means 74.

In addition, when film formation in the film forming chamber 52 is performed by sputtering, plasma CVD, or the like, an RF power supply, gas introduction means, or the like is further provided in the film forming chamber 52.

The substrate $B_{y1}$ is transported into the film forming chamber 52 through a slit 76a formed in a partition wall 76 for separating the feed chamber 50 from the film forming chamber 52.

Moreover, as a preferable form of the inorganic film forming apparatus 22 in the example shown in the drawing, vacuum exhaust means is also provided in the feed chamber 50 and the take-up chamber 54, and the feed chamber 50 and the take-up chamber 54 have a vacuum state according to the film forming pressure in the film forming chamber 52. However, the apparatus for execution of the present invention is not limited to this.

For example, it is also possible to form the film forming chamber 52 substantially airtight by making a slit, through which the substrate $B_{y1}$ passes, so as to be not in contact with the substrate $B_{y1}$ and have a minimum size allowing the substrate $B_{y1}$ to pass without providing the vacuum exhaust means in the feed chamber 50 and the take-up chamber 54.

Alternatively, a sub-chamber through which the substrate $B_{y1}$ passes may be provided between the feed chamber 50 and the film forming chamber 52 and between the take-up chamber 54 and the film forming chamber 52 without providing the vacuum exhaust means in the feed chamber 50 and the take-up chamber 54, and the inside of the sub-chamber may be made to have a vacuum state using a vacuum pump.

The substrate $B_{y1}$ transported into the film forming chamber 52 is guided along the predetermined path by the guide roller 68 and is wound at a predetermined position of the drum 62. The substrate $B_{y1}$ is transported in its longitudinal direction in a state located at the predetermined position by the drum 62, and the inorganic layer 14 is formed by the film forming means 64 using an inorganic film forming method.

The drum 62 of the film forming chamber 52 is a cylindrical member which rotates counterclockwise around the centerline in the drawing.

The substrate $B_{y1}$ which is supplied from the feed chamber 50, is guided along the predetermined path by the guide roller 68, and is wound at the predetermined position of the drum 62 rotates in a state hung in a predetermined region of the peripheral surface of the drum 62, and is transported along the predetermined transport path while being supported/guided on the drum 62. Then, the inorganic layer 14 is formed on the surface (on the first organic layer 12) by the film forming means 64. In addition, when film formation in the film forming chamber 52 is performed by sputtering, plasma CVD, or the like, the drum 62 may be grounded or may be connected to an RF power supply so as to also act as a counter electrode. In addition, temperature control means, such as cooling means, may be provided inside the drum 62.

The film forming means 64 is for forming the inorganic layer 14 on the surface of substrate $B_{y1}$, in which the first organic layer 12 is formed, using a vacuum deposition method.

In the manufacturing method according to the embodiment of the present invention, there is no particular limitation on the method of forming the inorganic layer 14, and all kinds of known vacuum deposition methods (vapor deposition methods), such as CVD, plasma CVD, sputtering, vacuum deposition, and ion plating, may be used.

Therefore, in the film forming chamber 52 of the inorganic film forming apparatus 22, the film forming means 64 is formed by various kinds of members according to a vacuum deposition method to be executed.

For example, in order to form the inorganic layer 14 in the film forming chamber 52 using an ICP-CVD (inductive coupled plasma CVD) method, the film forming means 64 is configured to include an induction coil for forming an induced magnetic field, gas supply means for supplying reactive gas to a film forming region, and the like.

In order to form the inorganic layer 14 in the film forming chamber 52 using a CCP-CVD (capacitive coupled plasma CVD) method, the film forming means 64 is configured to include a shower head electrode which is hollow and has a large number of small holes at the surface facing the drum 62, which is connected to a reactive gas supply source, and which serves as an RF electrode and reactive gas supply means.

In order to form the inorganic layer 14 in the film forming chamber 52 using a CVD method, the film forming means 64 is configured to include gas supply means and the like.

In addition, in order to form the inorganic layer 14 in the film forming chamber 52 by sputtering, the film forming means 64 is configured to include target holding means or an RF electrode, gas supply means, and the like.

The vacuum exhaust means 74 exhausts the air from the film forming chamber 52 to make a vacuum state inside the film forming chamber 52, so that the degree of vacuum according to formation of the inorganic layer 14 using a vacuum deposition method is obtained.

There is no particular limitation on the vacuum exhaust means 74, and it is possible to use all kinds of known (vacuum) exhaust means used in a vacuum deposition apparatus, which uses vacuum pumps such as a turbomolecular pump, a mechanical booster pump, and a rotary pump, auxiliary means such as a cryogenic coil, and means for adjusting an ultimate degree of vacuum or the amount of exhaust gas.

The substrate $B_{y1}$ which is supported/transported by the drum 62 and has the inorganic layer 14 formed by the film forming means 64, that is, the substrate $B_{m2}$ is guided along the predetermined path by the guide roller 72 and is transported into the take-up chamber 54. Then, the substrate $B_{m2}$ is wound in a roll form by the winding shaft 58 to become the substrate roll 40 and is then supplied to the organic film forming apparatus 20 again.

In the manufacturing method according to the present embodiment of the present invention, there is no particular limitation on the inorganic layer 14 to be formed, and it is possible to use all kinds of known films with a gas barrier property (vapor barrier property).

Specifically, preferred examples of the inorganic layer 14 include layers formed of: metal oxides such as aluminium oxide, magnesium oxide, tantalum oxide, zirconium oxide, titanium oxide, and indium tin oxide (ITO); metal nitrides such as aluminium nitride; metal carbide such as aluminium carbide; silicon oxides such as silicon oxide, silicon oxynitride, silicon oxycarbide, and silicon carbide oxynitride; silicon nitrides such as silicon nitride and silicon carbide nitride; silicon carbides such as silicon carbide; hydrides of the above materials; mixtures of two or more kinds of materials described above; and hydrogen-containing compounds of the above materials.

Especially, silicon nitride, silicon oxide, silicon oxynitride, and aluminium oxide are preferable as a material of an inorganic layer of a functional film from the point of view in which a more preferable gas barrier property can be obtained.

Moreover, in the present invention, the inorganic film is not limited to a single-layered film formed of an inorganic compound with a gas barrier property like the inorganic layer 14 shown in FIG. 1, and an inorganic film having various layers may be used.

As described above, in the present invention, all inorganic layers are formed so as to be thinner than all organic layers. That is, in the present embodiment, the inorganic layer 14 is formed so as to be thinner than the first organic layer 12 and the uppermost organic layer 16.

As described above, since an inorganic layer is formed on an organic layer which covers irregularities and has a smooth surface in the present invention, it is not necessary to form the inorganic layer thick in order to prevent the occurrence of a defect. Therefore, even if the inorganic layer is formed thin, a sufficient gas barrier property can be realized since a defect does not occur.

In addition, although the thickness of the inorganic layer 14 is not particularly limited, it is preferable to set the thickness of the inorganic layer 14 to 15 to 100 nm. By setting the thickness of the inorganic layer 14 to 15 nm or more, a sufficient gas barrier property can be realized. In addition, the inorganic layer 14 may crack if the inorganic layer 14 is formed too thick, such a crack can be prevented by setting the thickness of the inorganic layer 14 to 100 nm or less. In addition, it is more preferable to set the thickness of the inorganic layer 14 to 20 to 75 nm.

In addition, it is preferable that refractive indices of all inorganic layers be higher than those of all organic layers. By setting the refractive indices of all inorganic layers to be higher than those of all organic layers, an inorganic film is interposed between organic layers with lower refractive indices than the refractive index of the inorganic layer. Accordingly, since an interference fringe is removed, an anti-reflection function can be given. As a result, since an increase in the reflectance of a functional film can be prevented, the transmittance can be improved.

Here, it is preferable to set the refractive index of an inorganic layer to 1.82 or less. By setting the refractive index of the inorganic layer to 1.82 or less in order to reduce a difference between the refractive indices of the organic layer and the inorganic layer, it is possible to prevent an increase in the reflectance at the interface with the organic layer and eventually to prevent a reduction in the transmittance.

In the present invention, one means for forming the inorganic layer 14 may be provided in the film forming chamber 52, or two or more film forming means may be provided. In addition, the inorganic layer 14 may be a single layer or may be formed to have a plurality of layers. When forming an inorganic film so as to have a plurality of layers, these layers may be the same or may be different.

In the inorganic film forming apparatus 22, the substrate $B_{y1}$ which has the inorganic layer 14 formed in the film forming chamber 52 by the film forming means 64, that is, the substrate $B_{m2}$ is guided by the guide roller 72 and is transported into the take-up chamber 54 through a slit 78a formed in a partition wall 78 for separating the film forming chamber 52 from the take-up chamber 54.

In the example shown in the drawing, the take-up chamber 54 includes a guide roller 80, the winding shaft 58, and vacuum exhaust means 82.

The substrate $B_{m2}$ transported into the take-up chamber 54 is transported to the winding shaft 58 by guiding of the guide roller 80, is wound in a roll form by the winding shaft 58, and is supplied as the substrate $B_{m2}$ for the next process. In addition, similar to the feed chamber 50, the vacuum exhaust means 82 is also disposed in the take-up chamber 54 so that the take-up chamber 54 is decompressed to the degree of vacuum according to the film forming pressure in the film forming chamber 52 during film formation. In addition, it is preferable to use known devices as the vacuum exhaust means 82, similar to the vacuum exhaust means 74 of the film forming chamber 52.

In the embodiment described above, the first organic layer 12 and the uppermost organic layer 16 are formed by the same organic film forming apparatus 20. However, the present invention is not limited to this, and the first organic layer 12 and the uppermost organic layer 16 may be formed by different organic film forming apparatuses.

In addition, the first organic layer 12 and the uppermost organic layer 16 are formed by the same film forming method. However, the present invention is not limited to this, and the first organic layer 12 and the uppermost organic layer 16 may be formed using different film forming methods. For example, the first organic layer may be formed using a flash evaporation method, and the uppermost organic layer may be formed by application.

Figure 3A:
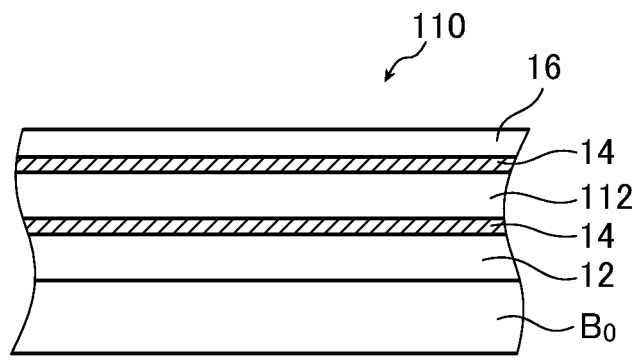
FIGS. 3A and 3B are conceptual views showing other examples of the functional film according to the embodiment of the present invention.
Figure 3B:
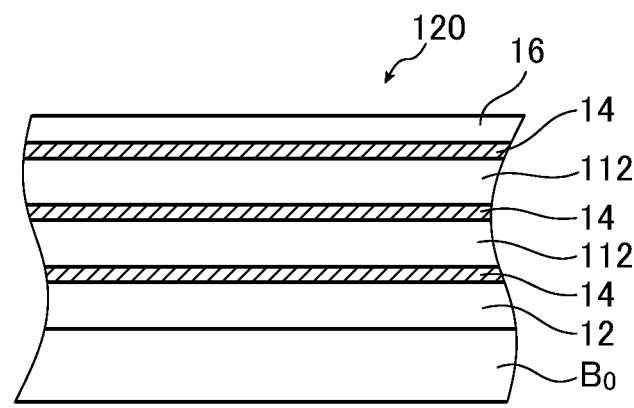

Moreover, in the manufacturing method according to the embodiment of the present invention, the functional film obtained by forming an organic layer and an inorganic layer alternately on the substrate is not limited to having a 3-layer configuration of "first organic layer 12/inorganic layer 14/uppermost organic layer 16" as shown in FIG. 1, and may be a functional film with a layer configuration of five or more layers, such as a functional film with a 5-layer configuration of "first organic layer 12/inorganic layer 14/middle organic layer 112/inorganic layer 14/uppermost organic layer 16" as shown in FIG. 3A or a functional film with a 7-layer configuration of "first organic layer 12/inorganic layer 14/second organic layer 112/inorganic layer 14/second organic layer 112/inorganic layer 14/uppermost organic layer 16" as shown in FIG. 3B.

FIGS. 3A and 3B are conceptual views showing other examples of the functional film according to the embodiment of the present invention.

In addition, functional films 110 and 120 shown in FIGS. 3A and 3B have the same configuration as the functional film 10 shown in FIG. 1 except that the second organic layer 112 and the inorganic layer 14 are further provided. Accordingly, the same parts are denoted by the same reference numerals, and the following explanation will be focused on different parts.

The functional film 110 shown in FIG. 3A is a functional film obtained by forming the first organic layer 12 having a polymer as its main component on the surface of the substrate $B_0$, forming the inorganic layer 14 on the first organic layer 12 using a vacuum deposition method, forming the second organic layer 112 on the inorganic layer 14, forming the inorganic layer 14 on the second organic layer 112, and forming the uppermost organic layer 16 on the inorganic layer 14.

The second organic layer 112 is formed on the substrate $B_{m2}$ in which the first organic layer 12 and the inorganic layer 14 are formed on the substrate $B_0$, that is, on the inorganic layer 14 using the organic film forming apparatus 20.

The method of forming the second organic layer 112 using the organic film forming apparatus 20 is basically the same as a method of forming of the first organic layer 12 and the uppermost organic layer 16.

In the present invention, the thickness of the second organic layer 112 is equal to or smaller than that of the first organic layer 12 and is equal to or larger than the uppermost organic layer 16.

By setting the thickness of the second organic layer 112 to be equal to or larger than that of the uppermost organic layer 16, it is possible to improve the smoothness since the irregularities of the substrate $B_{m2}$ are covered. Accordingly, since the occurrence of a defect in the inorganic layer 14 formed on the second organic layer 112 can be prevented, the gas barrier property can be improved. Here, since the second organic layer 112 is formed on the inorganic layer 14 with few irregularities compared with the substrate $B_0$, the irregularities of the substrate $B_{m2}$ can be sufficiently covered even if the thickness of the second organic layer 112 is equal to or smaller than that of the first organic layer 12 formed on the substrate $B_0$. As a result, the smoothness can be improved. In addition, it is possible to prevent cracking and a reduction in the transmittance by setting the thickness of the second organic layer 112 to be equal to or smaller than that of the first organic layer 12.

Here, it is preferable to set the thickness of the second organic layer 112 to 500 to 3000 nm. By forming the second organic layer 112 with a thickness of 500 nm or more, irregularities on the substrate $B_0$ can be sufficiently covered. As a result, it is possible to improve the smoothness of the surface as a base for forming an inorganic layer. In addition, it is possible to prevent cracking or a reduction in the transmittance by setting the thickness of the second organic layer 112 to 3000 nm or less. In addition, it is more preferable to set the thickness of the second organic layer 112 to 500 to 2500 nm.

In addition, it is preferable to set the refractive index of the second organic layer 112 to be higher than that of the uppermost organic layer 16. By setting the refractive index of the second organic layer 112 to be higher than the uppermost organic layer 16, it is possible to prevent an increase in the reflectance at the interface with an inorganic layer and eventually to prevent a reduction in the transmittance. Specifically, it is preferable to set the refractive index of the second organic layer 112 to 1.45 to 1.72.

The functional film 120 shown in FIG. 3B is manufactured by forming the second organic layer 112 and the inorganic layer 14 further before forming the uppermost organic layer 16 in the functional film 110 shown in FIG. 3A. That is, the functional film 120 is a functional film with a 7-layer configuration.

Thus, the second organic layer 112 and the inorganic layer 14 may be made to overlap in order to form a functional film with a layer configuration of seven or more layers.

While the functional film and the method of manufacturing a functional film according to the embodiments of the present invention have been described in detail, the present invention is not limited to the embodiments described above, but various modifications and changes may be made without departing from the scope and spirit of the present invention.

EXAMPLES

Hereinafter, the present invention will be described in more detail through specific examples.

Example 1-1

In Example 1-1, a functional film with a 3-layer configuration shown in FIG. 1 was manufactured.

As the substrate $B_0$, a long PET film (polyethylene terephthalate) with a width of 1000 mm and a thickness of 100 μm was used.

As a coating material for forming the first organic layer 12, a mixed solution obtained by mixing 200 g of acrylate based monomer (manufactured by Nippon Kayaku Co., Ltd., TMPTA), 20 g of photopolymerization initiator (manufactured by Nagase & Co., Ltd., Irg907), and 1700 g of organic solvent (MEK). In addition, the refractive index was adjusted by mixing 5 g of dispersion of titanium oxide (manufactured by JSR; MEK 10% dispersion) into the mixed solution.

Using the organic film forming apparatus 20 shown in FIG. 2A, the first organic layer 12 was formed on the surface of the substrate $B_0$ by applying/drying a prepared coating material and polymerizing a monomer mixture by UV irradiation.

A die coater was used as the application means 26, and the application was controlled such that the thickness of the coating material became 10 μm. As the drying means 28, drying means which uses warm air at 100° C. was used to dry the coating material. In addition, an ultraviolet irradiation device was used as the UV irradiation device 30. The UV irradiation device controlled the amount of light such that the total amount of UV radiation became about 500 mJ/cm². The film thickness of the obtained first organic layer 12 was 1000 nm. In addition, the measured refractive index of the first organic layer 12 was 1.60.

Then, the substrate roll 42 was mounted into the inorganic film forming apparatus 22 shown in FIG. 2B, and an aluminum oxide film (alumina film) with a thickness of 50 nm serving as the inorganic layer 14 was formed on the surface of the substrate $B_{y1}$ in which the first organic layer 12 was formed.

A film forming apparatus using reactive sputtering was used for the film forming chamber 52. Metal aluminum was used as a target and oxygen gas and argon gas were used as process gas.

After mounting the substrate roll 42 on the rotary shaft 56 of the feed chamber 50, the substrate $B_{y1}$ was transported to the take-up chamber 54 through the film forming chamber 52 along a predetermined transport path.

Then, the vacuum exhaust means 74 was driven to start exhausting the air from the film forming chamber 52, and introduction of the process gas into the film forming chamber 52 was started when the pressure became $5 \times 10^{-4}$ Pa. Then, the exhaust using the exhaust means 74 was controlled to set the pressure in the film forming chamber 52 to $1 \times 10^{-3}$ Pa. At the same time as the start of exhaust of the film forming chamber 52, the vacuum exhaust means 61 and 82 were driven to exhaust the air from the feed chamber 50 and the take-up chamber 54, and the inside pressure was controlled to $5 \times 10^{-4}$ Pa.

At the same time as the start of introduction of gas into the film forming chamber 52, transport of the substrate $B_{y1}$ was started. When the pressure of each chamber was stabilized at $5 \times 10^{-4}$ Pa, supply of electric power to a cathode of the film forming means 64 was started to form the inorganic layer 14 (aluminium oxide film) on the substrate $B_{y1}$ (surface of the first organic layer 12) by reactive sputtering. In addition, the amount of introduced oxygen was adjusted so that the refractive index of the inorganic layer 14 became 1.68.

Then, the substrate roll 40 was mounted into the organic film forming apparatus 20 shown in FIG. 2A, and the uppermost organic layer 16 was formed on the surface of the substrate $B_{m2}$ in which the inorganic layer 14 was formed.

As a coating material for forming the uppermost organic layer 16, a mixed solution obtained by mixing 50 g of acrylate based monomer (manufactured by Nippon Kayaku Co., Ltd., TMPTA), 20 g of photopolymerization initiator (manufactured by Nagase & Co., Ltd., Irg907), and 1700 g of organic solvent (MEK). The refractive index was adjusted by mixing 5 g of dispersion of titanium oxide (manufactured by JSR; MEK 10% dispersion) into the mixed solution.

Using the organic film forming apparatus 20 shown in FIG. 2A, the uppermost organic layer 16 was formed on the surface of the substrate $B_{m2}$ by applying/drying a prepared coating material and polymerizing a monomer mixture by UV irradiation.

A die coater was used as the application means 26, and the application was controlled such that the thickness of the coating material became 4 μm. The UV irradiation device 30 controlled the amount of light such that the total amount of UV radiation became about 500 J/cm². The thickness of the obtained uppermost organic layer 16 was 100 nm. In addition, the measured refractive index of the uppermost organic layer 16 was 1.45.

For the manufactured functional film, the water vapor transmission rate at the temperature of 40° C. and the relative humidity of 90% was measured using a Ca method, and the gas barrier property was evaluated.

The case when the water vapor transmission rate was smaller than $1.0 \times 10^{-4}$ g/(m²·day) was rated "excellent."

The case when the water vapor transmission rate was equal to or larger than $1.0 \times 10^{-4}$ g/(m²·day) and smaller than $2.0 \times 10^{-4}$ g/(m²·day) was rated "good."

The case when the water vapor transmission rate was equal to or larger than $2.0 \times 10^{-4}$ g/(m²·day) and smaller than $1.6 \times 10^{-3}$ g/(m²·day) was rated "fair."

The case when the water vapor transmission rate was equal to or larger than $1.6 \times 10^{-3}$ g/(m²·day) was rated "poor."

As a result of measurement, the water vapor transmission rate was $1.5 \times 10^{-4}$ g/(m²·day). Accordingly, the evaluation was "good."

Moreover, for the manufactured functional film, the total light transmittance was measured using a spectrophotometer, and the transmittance was evaluated.

The case when the total light transmittance was equal to or larger than 85% was rated "good."

The case when the total light transmittance was equal to or larger than 68% and smaller than 85% was rated "fair."

The case when the water vapor transmission rate was smaller than 68% was rated "poor."

As a result of measurement, the total light transmittance was 88%. Accordingly, the evaluation was "good."

If the evaluation of "fair" to "excellent" is given for both the gas barrier property and the transmittance, the performance is satisfactory in practice.

Example 1-2

A functional film was manufactured by forming the first organic layer 12, the inorganic layer 14, and the uppermost organic layer 16 in this order on the surface of the substrate $B_0$ in the same manner as in Example 1-1 except that the thickness of the first organic layer 12 was changed to 150 nm.

After the manufacturing, the gas barrier property was evaluated in the same manner as in Example 1-1. As a result, the water vapor transmission rate was $1.5 \times 10^{-3}$ g/(m²·day). Accordingly, the evaluation was "fair." In addition, when the transmittance was evaluated, the total light transmittance was 88%. Accordingly, the evaluation was "good."

Example 1-3

A functional film was manufactured by forming the first organic layer 12, the inorganic layer 14, and the uppermost organic layer 16 in this order on the surface of the substrate $B_0$ in the same manner as in Example 1-1 except that the thickness of the first organic layer 12 was changed to 3100 nm and the thickness of the uppermost organic layer 16 was changed to 1000 nm.

After the manufacturing, the gas barrier property was evaluated in the same manner as in Example 1-1. As a result, the water vapor transmission rate was $2.4 \times 10^{-4}$ g/(m²·day). Accordingly, the evaluation was "good." In addition, when the transmittance was evaluated, the total light transmittance was 89%. Accordingly, the evaluation was "good."

Example 1-4

A functional film was manufactured by forming the first organic layer 12, the inorganic layer 14, and the uppermost organic layer 16 in this order on the surface of the substrate $B_0$ in the same manner as in Example 1-1 except that the thickness of the first organic layer 12 was changed to 500 nm.

After the manufacturing, the gas barrier property was evaluated in the same manner as in Example 1-1. As a result, the water vapor transmission rate was $1.8 \times 10^{-4}$ g/(m²·day). Accordingly, the evaluation was "good." In addition, when the transmittance was evaluated, the total light transmittance was 88%. Accordingly, the evaluation was "good."

Example 1-5

A functional film was manufactured by forming the first organic layer 12, the inorganic layer 14, and the uppermost organic layer 16 in this order on the surface of the substrate $B_0$ in the same manner as in Example 1-1 except that the thickness of the uppermost organic layer 16 was changed to 500 nm.

After the manufacturing, the gas barrier property was evaluated in the same manner as in Example 1-1. As a result, the water vapor transmission rate was $1.6 \times 10^{-4}$ g/(m²·day). Accordingly, the evaluation was "good." In addition, when the transmittance was evaluated, the total light transmittance was 83%. Accordingly, the evaluation was "fair."

Example 1-6

A functional film was manufactured by forming the first organic layer 12, the inorganic layer 14, and the uppermost organic layer 16 in this order on the surface of the substrate $B_0$ in the same manner as in Example 1-1 except that the thickness of the uppermost organic layer 16 was changed to 1000 nm.

After the manufacturing, the gas barrier property was evaluated in the same manner as in Example 1-1. As a result, the water vapor transmission rate was $1.7 \times 10^{-4}$ g/(m²·day). Accordingly, the evaluation was "good." In addition, when the transmittance was evaluated, the total light transmittance was 78%. Accordingly, the evaluation was "fair."

Comparative Example 1-1

A functional film was manufactured by forming the first organic layer 12, the inorganic layer 14, and the uppermost organic layer 16 in this order on the surface of the substrate $B_0$ in the same manner as in Example 1-1 except that the thickness of the first organic layer 12 was changed to 40 nm and the first organic layer 12 was formed so as to be thinner than the inorganic layer 14.

After the manufacturing, the gas barrier property was evaluated in the same manner as in Example 1-1. As a result, the water vapor transmission rate was $3.5 \times 10^{-3}$ g/(m²·day). Accordingly, the evaluation was "poor." In addition, when the transmittance was evaluated, the total light transmittance was 88%. Accordingly, the evaluation was "good."

Comparative Example 1-2

A functional film was manufactured by forming the first organic layer 12, the inorganic layer 14, and the uppermost organic layer 16 in this order on the surface of the substrate $B_0$ in the same manner as in Example 1-1 except that the thickness of the first organic layer 12 was changed to 75 nm and the first organic layer 12 was formed so as to be thinner than other organic layers, that is, the uppermost organic layer 16.

After the manufacturing, the gas barrier property was evaluated in the same manner as in Example 1-1. As a result, the water vapor transmission rate was $2.5 \times 10^{-3}$ g/(m²·day). Accordingly, the evaluation was "poor." In addition, when the transmittance was evaluated, the total light transmittance was 88%. Accordingly, the evaluation was "good."

Comparative Example 1-3

A functional film was manufactured by forming the first organic layer 12, the inorganic layer 14, and the uppermost organic layer 16 in this order on the surface of the substrate $B_0$ in the same manner as in Example 1-1 except that the thickness of the uppermost organic layer 16 was changed to 10 nm and the uppermost organic layer 16 was formed so as to be thinner than the inorganic layer 14.

After the manufacturing, the gas barrier property was evaluated in the same manner as in Example 1-1. As a result, the water vapor transmission rate was $2.1 \times 10^{-3}$ g/(m²·day). Accordingly, the evaluation was "poor." In addition, when the transmittance was evaluated, the total light transmittance was 89%. Accordingly, the evaluation was "good."

Example 2-1

In Example 2-1, a functional film with a 5-layer configuration shown in FIG. 3A was manufactured.

In the seventh example, the functional film was manufactured by forming the first organic layer 12, the inorganic layer 14, the second organic layer 112, the inorganic layer 14, and the uppermost organic layer 16 in this order on the surface of the substrate $B_0$ in the same manner as in Example 1-1 except that the second organic layer 112 and the inorganic layer 14 were formed below the uppermost organic layer 16 of the functional film in Example 1-1.

Using the organic film forming apparatus 20 shown in FIG. 2A, the second organic layer 112 was formed on the surface of the substrate $B_{m2}$, in which the first organic layer 12 and the inorganic layer 14 were formed on the substrate $B_0$, by applying/drying a prepared coating material and polymerizing a monomer mixture by UV irradiation.

As the coating material for forming the second organic layer 112, a mixed solution obtained by mixing 200 g of acrylate based monomer (manufactured by Nippon Kayaku Co., Ltd., TMPTA), 20 g of photopolymerization initiator (manufactured by Nagase & Co., Ltd., Irg907), and 1700 g of organic solvent (MEK). In addition, the refractive index was adjusted by mixing 5 g of dispersion of titanium oxide (manufactured by JSR; MEK 10% dispersion) into the mixed solution.

A die coater was used as the application means 26, and the application was controlled such that the thickness of the coating material became 5 μm. The UV irradiation device 30 controlled the amount of light such that the total amount of UV radiation became about 500 mJ/cm$^2$. The film thickness of the obtained second organic layer 112 was 500 nm. In addition, the measured refractive index of the second organic layer 112 was 1.60.

After the manufacturing, the gas barrier property was evaluated in the same manner as in Example 1-1. As a result, the water vapor transmission rate was $8.4 \times 10^{-5}$ g/(m$^2$·day). Accordingly, the evaluation was "excellent." In addition, when the transmittance was evaluated, the total light transmittance was 88%. Accordingly, the evaluation was "good."

Example 2-2

A functional film was manufactured by forming the first organic layer 12, the inorganic layer 14, the second organic layer 112, the inorganic layer 14, and the uppermost organic layer 16 in this order on the surface of the substrate $B_0$ in the same manner as in Example 2-1 except that the thickness of the second organic layer 112 was changed to 1000 nm and the thickness of the uppermost organic layer 16 was changed to 1000 nm.

After the manufacturing, the gas barrier property was evaluated in the same manner as in Example 1-1. As a result, the water vapor transmission rate was $7.6 \times 10^{-5}$ g/(m$^2$·day). Accordingly, the evaluation was "excellent." In addition, when the transmittance was evaluated, the total light transmittance was 76%. Accordingly, the evaluation was "fair."

Comparative Example 2-1

A functional film was manufactured by forming the first organic layer 12, the inorganic layer 14, the second organic layer 112, the inorganic layer 14, and the uppermost organic layer 16 in this order on the surface of the substrate $B_0$ in the same manner as in Example 2-1 except that the thickness of the second organic layer 112 was changed to 40 nm and the second organic layer 112 was formed so as to be thinner than the inorganic layer 14.

After the manufacturing, the gas barrier property was evaluated in the same manner as in Example 1-1. As a result, the water vapor transmission rate was $4.5 \times 10^{-4}$ g/(m$^2$·day). Accordingly, the evaluation was "fair." In addition, when the transmittance was evaluated, the total light transmittance was 88%. Accordingly, the evaluation was "good."

Comparative Example 2-2

A functional film was manufactured by forming the first organic layer 12, the inorganic layer 14, the second organic layer 112, the inorganic layer 14, and the uppermost organic layer 16 in this order on the surface of the substrate $B_0$ in the same manner as in Example 2-1 except that the thickness of the second organic layer 112 was changed to 75 nm and the second organic layer 112 was formed so as to be thinner than other organic layers, that is, the uppermost organic layer 16.

After the manufacturing, the gas barrier property was evaluated in the same manner as in Example 1-1. As a result, the water vapor transmission rate was $3.8 \times 10^{-4}$ g/(m$^2$·day). Accordingly, the evaluation was "fair." In addition, when the transmittance was evaluated, the total light transmittance was 88%. Accordingly, the evaluation was "good."

Comparative Example 2-3

A functional film was manufactured by forming the first organic layer 12, the inorganic layer 14, the second organic layer 112, the inorganic layer 14, and the uppermost organic layer 16 in this order on the surface of the substrate $B_0$ in the same manner as in Example 2-1 except that the thickness of the second organic layer 112 was changed to 2000 nm and the second organic layer 112 was formed so as to be thicker than the first organic layer 12.

After the manufacturing, the gas barrier property was evaluated in the same manner as in Example 1-1. As a result, the water vapor transmission rate was $2.1 \times 10^{-4}$ g/(m$^2$·day). Accordingly, the evaluation was "fair." In addition, when the transmittance was evaluated, the total light transmittance was 88%. Accordingly, the evaluation was "good." The evaluation results are shown in the following Table 1.

TABLE 1

| | thickness (nm) | | | | evaluation | |
| | first organic layer | inorganic layer | second organic layer | inorganic layer | uppermost organic layer | gas barrier property | transmittance |
|---|---|---|---|---|---|---|---|
| Example 1-1 | 1000 | 50 | — | — | 100 | good | good |
| Example 1-2 | 150 | 50 | — | — | 100 | fair | good |
| Example 1-3 | 3100 | 50 | — | — | 1000 | fair | good |

TABLE 1-continued

| | thickness (nm) | | | | | evaluation | |
|---|---|---|---|---|---|---|---|
| | first organic layer | inorganic layer | second organic layer | inorganic layer | uppermost organic layer | gas barrier property | transmittance |
| Example 1-4 | 500 | 50 | — | — | 100 | good | good |
| Example 1-5 | 1000 | 50 | — | — | 500 | good | fair |
| Example 1-6 | 1000 | 50 | — | — | 1000 | good | fair |
| Comparative Example 1-1 | 40 | 50 | — | — | 100 | poor | good |
| Comparative Example 1-2 | 75 | 50 | — | — | 100 | poor | good |
| Comparative Example 1-3 | 1000 | 50 | — | — | 10 | poor | good |
| Example 2-1 | 1000 | 50 | 500 | 50 | 100 | excellent | good |
| Example 2-2 | 1000 | 50 | 1000 | 50 | 1000 | excellent | fair |
| Comparative Example 2-1 | 1000 | 50 | 40 | 50 | 100 | fair | good |
| Comparative Example 2-2 | 1000 | 50 | 75 | 50 | 100 | fair | good |
| Comparative Example 2-3 | 1000 | 50 | 2000 | 50 | 100 | fair | good |

As shown in Table 1, it was possible to realize a high gas barrier property and a high transmittance in all examples of the present invention in which the thickness of the first organic layer was equal to or larger than those of other organic layers and the thickness of the uppermost organic layer was equal to or smaller than those of the other organic layers and all organic layers were thicker than all inorganic layers.

In addition, since the refractive indices of all organic layers were set to be lower than those of all inorganic layers in the above examples, it was possible to reduce the reflectance and accordingly, to obtain the excellent transmittance.

In addition, in Example 1-2 in which the thickness of the first organic layer was 500 nm or less, the gas barrier property became a little worse. Presumably, the gas barrier property of the inorganic layer became worse because the thickness of the layer was too small and the smoothness could not be obtained accordingly. In addition, in Example 1-3 in which the thickness of the first organic layer was set to 3000 nm or more, the gas barrier property became a little worse.

Presumably, this is because the thickness of the layer was so large as to cause cracking. Accordingly, it can be seen that the thickness of the first organic layer is preferably 500 to 3000 nm.

In addition, Examples 1-5 and 1-6 show that the transmittance decreases as the thickness of the uppermost organic layer increases. Therefore, it can be seen that the uppermost organic layer is preferably thin.

On the other hand, the gas barrier property became worse in Comparative Examples 1-1, 1-3 and 2-1 in which the organic layer was thinner than the inorganic layer. Presumably, this is because the thickness of the organic layer as a base of the inorganic layer was small and accordingly, the smoothness could not be obtained and this worsened the gas barrier property of the inorganic layer (Comparative Examples 1-1 and 2-1), or because protection of the inorganic layer was not enough and accordingly, the inorganic layer cracked or the like and this worsened the gas barrier property (Comparative Example 1-3).

In addition, the gas barrier property became worse in Comparative Example 1-2 in which the thickness of the first organic layer was smaller than those of other organic layers and Comparative Example 2-2 in which the thickness of the second organic layer was smaller than that of the uppermost organic layer. Presumably, the gas barrier property of the inorganic layer became worse because the thickness of the organic layer as a base of the inorganic layer was too small and the smoothness could not be obtained accordingly. In addition, the gas barrier property became worse in Comparative Example 2-3 in which the thickness of the second organic layer was larger than that of the first organic layer. Presumably, this is because the second organic layer was so thick as to cause cracking.

Next, in Examples 3-1 to 3-5, the refractive index of the functional film in Example 1-1 was changed for comparison.

Example 3-1

The refractive indices of the first organic layer and the uppermost organic layer were adjusted by changing the ratio of dispersion of titanium oxide (manufactured by JSR) mixed in a coating material of the organic layer.

In Example 3-1, a functional film was manufactured by forming the first organic layer 12, the inorganic layer 14, and the uppermost organic layer 16 in this order on the surface of the substrate $B_0$ in the same manner as in Example 1-1 except that the refractive indices of the first organic layer 12, the inorganic layer 14, and the uppermost organic layer 16 were changed to 1.64, 1.72, and 1.45, respectively.

After the manufacturing, the gas barrier property was evaluated in the same manner as in Example 1-1. As a result, the water vapor transmission rate was $1.5 \times 10^{-4}$ g/(m²·day). Accordingly, the evaluation was "good." In addition, when the transmittance was evaluated, the total light transmittance was 88%. Accordingly, the evaluation was "good."

Example 3-2

A functional film was manufactured by forming the first organic layer 12, the inorganic layer 14, and the uppermost organic layer 16 in this order on the surface of the substrate $B_0$ in the same manner as for the functional film in Example 3-1 except that the refractive index of the uppermost organic layer 16 was changed to 1.60.

After the manufacturing, the gas barrier property was evaluated in the same manner as in Example 1-1. As a result, the water vapor transmission rate was $1.4 \times 10^{-4}$ g/(m²·day).

Accordingly, the evaluation was "good." In addition, when the transmittance was evaluated, the total light transmittance was 79%. Accordingly, the evaluation was "fair."

Example 3-3

A functional film was manufactured by forming the first organic layer 12, the inorganic layer 14, and the uppermost organic layer 16 in this order on the surface of the substrate $B_0$ in the same manner as for the functional film in Example 3-1 except that the refractive index of the uppermost organic layer 16 was changed to 1.64.

After the manufacturing, the gas barrier property was evaluated in the same manner as in Example 1-1. As a result, the water vapor transmission rate was $1.6 \times 10^{-4}$ g/(m²·day). Accordingly, the evaluation was "good." In addition, when the transmittance was evaluated, the total light transmittance was 74%. Accordingly, the evaluation was "fair."

Example 3-4

A functional film was manufactured by forming the first organic layer 12, the inorganic layer 14, and the uppermost organic layer 16 in this order on the surface of the substrate $B_0$ in the same manner as for the functional film in Example 3-1 except that the refractive indices of the first organic layer 12 and the uppermost organic layer 16 were changed to 1.45 and 1.75, respectively.

After the manufacturing, the gas barrier property was evaluated in the same manner as in Example 1-1. As a result, the water vapor transmission rate was $1.5 \times 10^{-4}$ g/(m²·day). Accordingly, the evaluation was "good." In addition, when the transmittance was evaluated, the total light transmittance was 68%. Accordingly, the evaluation was "fair."

Example 3-5

A functional film was manufactured by forming the first organic layer 12, the inorganic layer 14, and the uppermost organic layer 16 in this order on the surface of the substrate $B_0$ in the same manner as for the functional film in Example 3-1 except that the refractive indices of the first organic layer 12 and the uppermost organic layer 16 were changed to 1.45 and 1.64, respectively.

After the manufacturing, the gas barrier property was evaluated in the same manner as in Example 1-1. As a result, the water vapor transmission rate was $1.4 \times 10^{-4}$ g/(m²·day). Accordingly, the evaluation was "good." In addition, when the transmittance was evaluated, the total light transmittance was 74%. Accordingly, the evaluation was "fair." The evaluation results are shown in the following Table 2.

TABLE 2

| | refractive index | | evaluation | |
|---|---|---|---|---|
| | first organic layer | inorganic layer | uppermost organic layer | gas barrier property | transmittance |
| Example 3-1 | 1.64 | 1.72 | 1.45 | good | 88 |
| Example 3-2 | 1.64 | 1.72 | 1.60 | good | 79 |
| Example 3-3 | 1.64 | 1.72 | 1.68 | good | 74 |
| Example 3-4 | 1.45 | 1.72 | 1.75 | good | 68 |
| Example 3-5 | 1.45 | 1.72 | 1.64 | good | 74 |

As shown in Table 2, in Example 3-4 in which the refractive index of the inorganic layer is lower than that of the organic layer, the transmittance is decreased. Therefore, it can be seen that it is preferable that the refractive index of the inorganic layer be higher than that of the organic layer. Moreover, in Examples 3-3, 3-4 and 3-5 in which the refractive index of the uppermost organic layer is higher than those of the other organic layers, the transmittance is decreased. Therefore, it can be seen that it is preferable that the refractive index of the uppermost organic layer be lower than those of the other organic layers. In addition, Examples 3-1, 3-2 and 3-3 show that the transmittance increases as the refractive index of the uppermost layer decreases and accordingly, it is preferable that the refractive index of the uppermost layer be low.

The effects of the present invention are apparent from the above results.

What is claimed is:

1. A gas barrier film comprising:
    a substrate;
    at least three organic layers; and
    at least two inorganic layers,
    wherein said at least three organic layers include a first organic layer directly formed on said substrate, a second organic layer which is an uppermost layer farthest from said substrate, and one or more intermediate organic layers between said first organic layer and said second organic layer, each intermediate organic layer being sandwiched between two inorganic layers,
    wherein each of said at least three organic layers and each of said at least two inorganic layers are alternatively laminated on said substrate in such a way that one of an organic layer and an inorganic layer is formed on the other of the organic layer and the inorganic layer,
    wherein said first organic layer is thicker than said one or more intermediate organic layers, and said second organic layer is thinner than said one or more intermediate organic layers,
    wherein said second organic layer is thicker than a thickest inorganic layer of said at least two inorganic layers,
    wherein a highest refractive index among each of said at least three organic layers is lower than a lowest refractive index among each of said at least two inorganic layers,
    wherein a refractive index of said second organic layer is lowest in refractive indices of each of said at least three organic layers,
    wherein the refractive index of said second organic layer ranges from 1.35 to 1.55, and refractive indices of each of said one or more immediate organic layers range from 1.45 to 1.72,
    wherein refractive indices of each of said at least two inorganic layers is 1.82 or less, and
    wherein a total light transmittance of the gas barrier film is equal to or larger than 85%.

2. The gas barrier film according to claim 1,
    wherein a thickness of said first organic layer ranges from 500 nm to 3000 nm, and a thickness of said second organic layer ranges from 80 nm to 1000 nm.

3. The gas barrier film according to claim 1,
    wherein said at least two inorganic layers is formed of silicon nitride, silicon oxide, silicon oxy-nitride, or aluminium oxide.

4. The gas barrier film according to claim 1,
    wherein said first organic layer and said second organic layer are made of different materials, respectively.

5. A method of manufacturing a gas barrier film in which at least three organic layers and at least two inorganic layers are laminated on a substrate in such a way that one of said at least two inorganic layers is formed on each of said at least three organic layers except an uppermost organic layer farthest from said substrate, comprising the steps of:

forming a first organic layer of said at least three organic layers directly on said substrate so as to be thicker than all others of said at least three organic layers;

forming an inorganic layer of said at least two inorganic layers on said first organic layer; and forming another organic layer of said at least three organic layers on said inorganic layer, wherein said forming step of said inorganic layer and said forming step of said another organic layer are performed at least once, and in a final forming step of said another organic layer, an uppermost organic layer as a second organic layer is formed on an inorganic layer which is located farthest from said substrate of said at least two inorganic layers so as to be thinner than all others of said at least three organic layers and to be thicker than a thickest inorganic layer of said at least two inorganic layers, wherein a highest refractive index among each of said at least three organic layers is lower than a lowest refractive index among each of said at least two inorganic layers, wherein a refractive index of said second organic layer is lowest in refractive indices of each of said at least three organic layers, wherein the refractive index of said second organic layer ranges from 1.35 to 1.55, and the refractive index of said another organic layer ranges from 1.45 to 1.72, wherein refractive indices of each of said at least two inorganic layers is 1.82 or less, and wherein a total light transmittance of the gas barrier film is equal to or larger than 85%.

6. The method of manufacturing a gas barrier film according to claim 5, wherein said at least three organic layers are formed using an application method.

7. The method of manufacturing a gas barrier film according to claim 6, wherein said second organic layer is formed by said application method using a die coater.

8. The method of manufacturing a gas barrier film according to claim 6, wherein, when applying a forming material for forming said first organic layer, the viscosity of said forming material of said first organic layer is equal to or smaller than 10 cP.

9. The method of manufacturing a gas barrier film according to claim 6, wherein, when applying a forming material for forming said second organic layer, the viscosity of said forming material of said second organic layer is equal to or smaller than 5 cP.

10. The method of manufacturing a gas barrier film according to claim 5, wherein said at least two inorganic layers are formed using a vacuum deposition method.

* * * * *